United States Patent
Morimoto et al.

(10) Patent No.: US 7,170,642 B2
(45) Date of Patent: Jan. 30, 2007

(54) IMAGE PROCESSING APPARATUS AND METHOD FOR IMPROVING OUTPUT IMAGE QUALITY

(75) Inventors: Etsuo Morimoto, Yokohama (JP); Hiroyuki Shibaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1000 days.

(21) Appl. No.: 10/119,957

(22) Filed: Apr. 11, 2002

(65) Prior Publication Data
US 2002/0181024 A1 Dec. 5, 2002

(30) Foreign Application Priority Data
Apr. 12, 2001 (JP) .............................. 2001-113517

(51) Int. Cl.
G06K 15/00 (2006.01)
G06K 15/02 (2006.01)
H04N 1/405 (2006.01)
H04N 1/409 (2006.01)
G06T 5/00 (2006.01)

(52) U.S. Cl. .................. 358/3.06; 358/3.15; 358/3.03; 358/3.27; 382/261; 382/199

(58) Field of Classification Search ............... 358/3.06, 358/1.9, 2.1, 3.26, 533, 520, 3.15, 3.03, 3.27; 382/169, 237, 275, 162, 167, 260–264, 199
See application file for complete search history.

(56) References Cited

U.S. PATENT DOCUMENTS 6,567,544 B1 *  5/2003  Kanno et al. ............... 382/169
6,897,983 B1 *  5/2005  Kawano .................... 358/3.26

FOREIGN PATENT DOCUMENTS

JP          8-15310          2/1996
JP          8-181864         7/1996

* cited by examiner

Primary Examiner—Kimberly Williams
Assistant Examiner—Charlotte M. Baker
(74) Attorney, Agent, or Firm—Dickstein Shapiro LLP

(57) ABSTRACT

An image processing apparatus includes a first filtering process device configured to perform a predetermined space frequency characteristic conversion process to input image data having multiple-level gradation. A conversion process device performs a gradation characteristic conversion process to an output result of the first filtering process device. A second filtering process device performs a predetermined space frequency characteristic conversion process to an output result of the conversion process device. A halftone processing device performs a quasi-gradation processing to an output result of the second filtering process device.

9 Claims, 16 Drawing Sheets

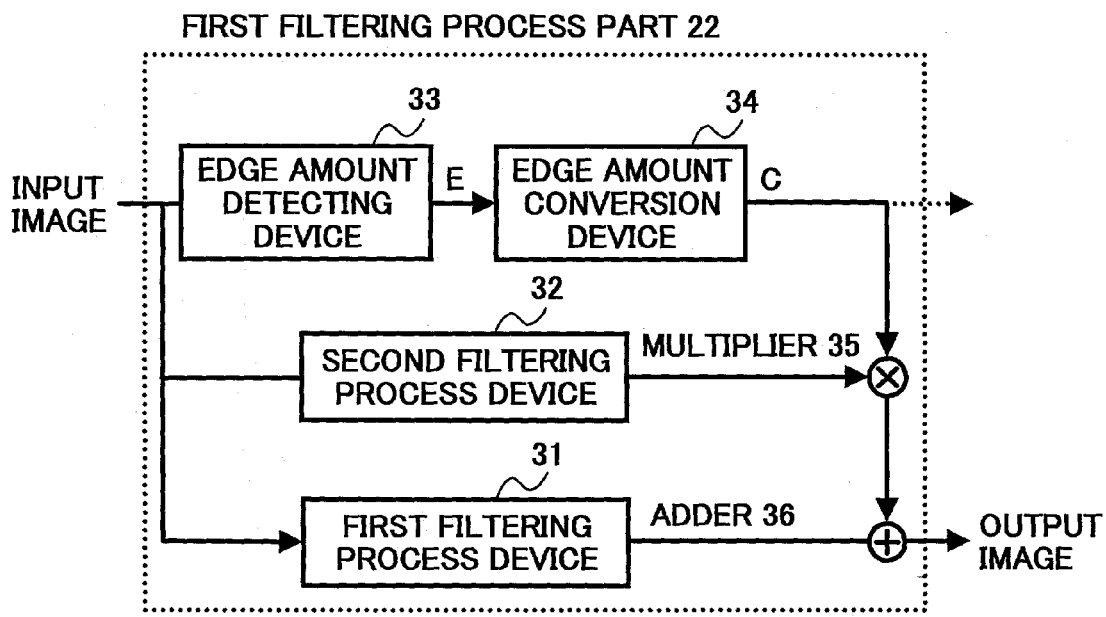

FIG. 7

| -1 | -1 | 0 | 1 | 1 |
|----|----|---|---|---|
| -1 | -1 | 0 | 1 | 1 |
| -1 | -1 | 0 | 1 | 1 |
| -1 | -1 | 0 | 1 | 1 |
| -1 | -1 | 0 | 1 | 1 |

FIG. 8

| -1 | -1 | -1 | -1 | -1 |
|----|----|----|----|----|
| -1 | -1 | -1 | -1 | -1 |
| 0  | 0  | 0  | 0  | 0  |
| 1  | 1  | 1  | 1  | 1  |
| 1  | 1  | 1  | 1  | 1  |

FIG. 9

| -1 | -1 | -1 | -1 | 0 |
|----|----|----|----|---|
| -1 | -1 | -1 | 0  | 1 |
| -1 | -1 | 0  | 1  | 1 |
| -1 | 0  | 1  | 1  | 1 |
| 0  | 1  | 1  | 1  | 1 |

FIG. 10

| 0  | 1  | 1  | 1  | 1 |
|----|----|----|----|---|
| -1 | 0  | 1  | 1  | 1 |
| -1 | -1 | 0  | 1  | 1 |
| -1 | -1 | -1 | 0  | 1 |
| -1 | -1 | -1 | -1 | 0 |

| -1 | 0 | -1 |
|---|---|---|
| 0 | 4 | 0 |
| -1 | 0 | -1 |

FIG. 16

| | | |
|---|---|---|
| 1 | 1 | 1 |
| 1 | 4 | 1 |
| 1 | 1 | 1 |

IMAGE PROCESSING APPARATUS AND METHOD FOR IMPROVING OUTPUT IMAGE QUALITY

The present application claims priority and contains subject matter related to Japanese Patent Application No. 2001-113517 filed in the Japanese Patent Office on Apr. 12, 2001, and the entire contents of which are hereby incorporated by reference.

BACKGROUND OF THE INVENTION

1. Field of the Invention

The present invention relates to a technology of improving image quality of an output image in digital image processing, suitable in particular for use in digital copying machines, facsimile machines, etc.

2. Discussion of the Background

A dot-concentrated dither method has been known as a halftone processing technology having advantages in dot formation stability and graininess, and has been used in copying machines, printers, etc. having an electrophotographic printing engine. However, if a dither process is applied to an inputted halftone dot image, an interfering moire is caused by a periodicity of a dither matrix and that of the halftone dot image. Various methods have been proposed for suppressing such a moire.

For example, in an apparatus, a smoothing process is performed to an input image of an original manuscript having a halftone dot area to reduce occurrence of an interfering moire caused by undulation of density (cyclic repetition of a high level density and a low level density) in the halftone dot area, and thereafter an edge enhancement process is performed to keep sharpness of edge portions of the image. In another apparatus, occurrence of a moire in a halftone dot area is suppressed by using a halftone dot level calculating filter configured to respond to a halftone dot portion of an input image and by performing a smoothing process according to a result of calculation at the halftone level calculating filter.

In duplicating an original manuscript by a digital copying machine, a socalled backside information duplicating phenomenon occurs, wherein information or an image on a backside of the original manuscript transmits through a sheet of the original manuscript, so that the backside information or image is duplicated while being mixed with an image on a front (duplicating) side of the original manuscript.

Once such undesired information or an image on the backside of the original manuscript has been mixed with the desired image on the front (duplicating) side of the original manuscript and converted to image information, in the resultant image, the backside information or image has substantially the same density characteristic as a low-contrast portion of the desired image on the front (duplicating) side of the original manuscript. Therefore, it is relatively difficult to remove only the undesired backside information or image from the image information. In one method to prevent such a backside information duplicating phenomenon from occurring, so-called a γ conversion process the output value for a low-contrast portion of an image on a duplicating side of the original manuscript, at which input value the information or image on the backside of the original manuscript might be duplicated, is converted to zero representing "white".

As described above, a smoothing process is performed to a halftone dot area to reduce the occurrence of an interfering moire. However, if a smoothing process is performed to a low-density area of the halftone dot area, the difference between a high level density and a low level density in the low-density area of the halftone dot area is eliminated, so that the density of the low-density area of the halftone dot area is uniformly converted to the low level density. Further, when performing a γ correction process after the smoothing process, to prevent a backside information duplicating phenomenon from occurring, a γ characteristic that converts a low-contrast portion to "white" is used. Therefore, the halftone dot area which has been processed by the smoothing process to be in a uniform low level density is converted to a further lower level density or to "white" (i.e., the output value is zero). As a result, the density of the low-density halftone dot area is reduced, or information of the low-density halftone dot area is omitted.

SUMMARY OF THE INVENTION

The present invention has been made in view of the above-discussed and other problems and addresses the above-discussed and other problems.

Preferred embodiments of the present invention provide a novel image processing apparatus and a novel image processing method that prevent occurrence of a backside information duplicating phenomenon and at the same time prevents occurrence of density decrease or information omission at a low-density halftone dot area of an image and suppresses occurrence of an interfering moire in halftone processing at a later stage, and that performs a high quality reproduction of an image without deteriorating sharpness of edge portions of character and line images in the image.

According to a preferred embodiment of the present invention, an image processing apparatus includes a first filtering process device configured to perform a predetermined space frequency characteristic conversion process to input image data having multiple-level gradation. A conversion process device performs a gradation characteristic conversion process to an output result of the first filtering process device. A second filtering process device performs a predetermined space frequency characteristic conversion process to an output result of the conversion process device. A halftone processing device performs a quasi-gradation processing to an output result of the second filtering process device.

According to another preferred embodiment of the present invention, an image processing apparatus includes a first filtering process device configured to perform a predetermined space frequency characteristic conversion process to input image data having multiple-level gradation. A conversion process device performs a gradation characteristic conversion process to an output result of the first filtering process device. A second filtering process device performs a smoothing process to an output result of the conversion process device according to a characteristic of an image of a selected picture element or picture elements in the vicinity of the selected picture element. A halftone processing device performs a quasi-gradation processing to an output result of the second filtering process device.

In each of the above image processing apparatuses, the conversion process device may be configured to convert an output for a low-contrast portion of the input image data to zero or to a value close to zero. Further, the first filtering process device may be configured to enhance a medium-to-high frequency component of the input image data.

Further, in the image processing apparatus described above first, the second filtering process device may be configured to smooth a frequency component of the input image data causing an interfering moire.

Furthermore, in the image processing apparatus described above secondly, the image characteristic includes an edge amount, in this case the second filtering process device is configured to increase a smoothing degree as the edge amount is smaller, and the halftone processing device is configured to increase a dither amplitude as the edge amount is smaller.

BRIEF DESCRIPTION OF THE DRAWINGS

A more complete appreciation of the present invention and many of the attendant advantages thereof will be readily obtained as the same becomes better understood by reference to the following detailed description when considered in conjunction with accompanying drawings, wherein:

FIG. 3 is a diagram illustrating a configuration of a first filtering process part of the image processing apparatus;

FIG. 4 is a diagram illustrating exemplary coefficients of a filter of a first filtering process device of the first filtering process part;

FIG. 7 is a diagram illustrating a filter for detecting an edge component in a vertical direction;

FIG. 8 is a diagram illustrating a filter for detecting an edge component in a horizontal direction;

FIG. 9 is a diagram illustrating a filter for detecting an edge component in a rightward slanting direction;

FIG. 10 is a diagram illustrating a filter for detecting an edge component in a leftward slanting direction;

FIG. 16 is a diagram illustrating exemplary coefficients of a filter of a second filtering process part of the image processing apparatus;

DETAILED DESCRIPTION OF THE PREFERRED EMBODIMENTS

Figure 1:
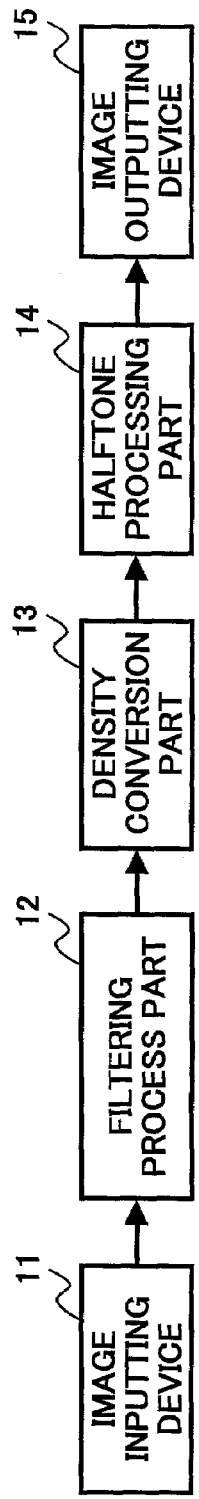
FIG. 1 is a diagram illustrating a configuration of a prior art image processing apparatus.

Referring now to the drawings, wherein like reference numerals designate identical or corresponding parts throughout the several views, preferred embodiments of the present invention are described.

FIG. 1 illustrates a configuration of a prior art image processing apparatus. An image signal inputted by an image inputting device 11 is processed by a filtering process part 12 so that a space frequency characteristic of the inputted image signal is corrected. The image signal is then inputted into a density conversion (conversion) part 13, where a gradation characteristic of an original manuscript is converted to a desired gradation characteristic for an output image of an image outputting device 15. A halftone processing part 14 performs a quasi-gradation processing. The image outputting device 15 performs outputting of an image onto a sheet, etc.

Figure 2:
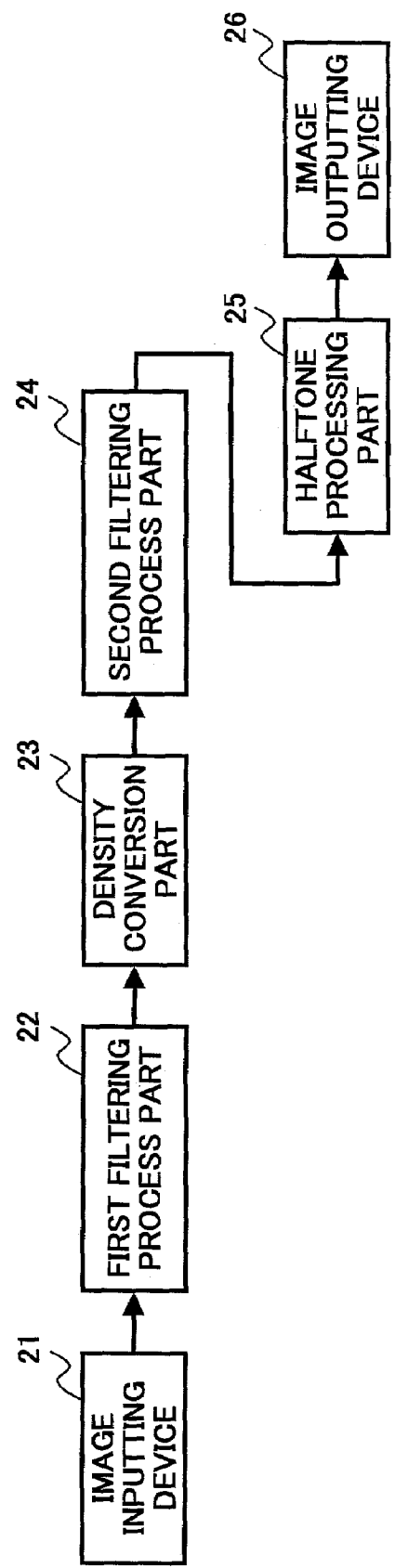
FIG. 2 is a diagram illustrating an exemplary configuration of an image processing apparatus according to a preferred embodiment of the present invention.

FIG. 2 illustrates an exemplary configuration of an image processing apparatus according to a preferred embodiment of the present invention. In FIG. 2, an image signal inputted by an image inputting device 21 is processed by a first filtering process part 22 so that a space frequency characteristic of the inputted image signal is corrected. The image signal is then inputted into a density conversion correction) part 23, where a graduation characteristic of an original manuscript is converted to a desired gradation characteristic for an output image of an image outputting device 26. Thereafter, the image signal is processed by a second filtering process part 24 so that the space frequency characteristic is corrected. A halftone processing part 25 performs a quasi-gradation processing. The image outputting device 26 performs outputting of an image onto a sheet, etc.

Figure 5:
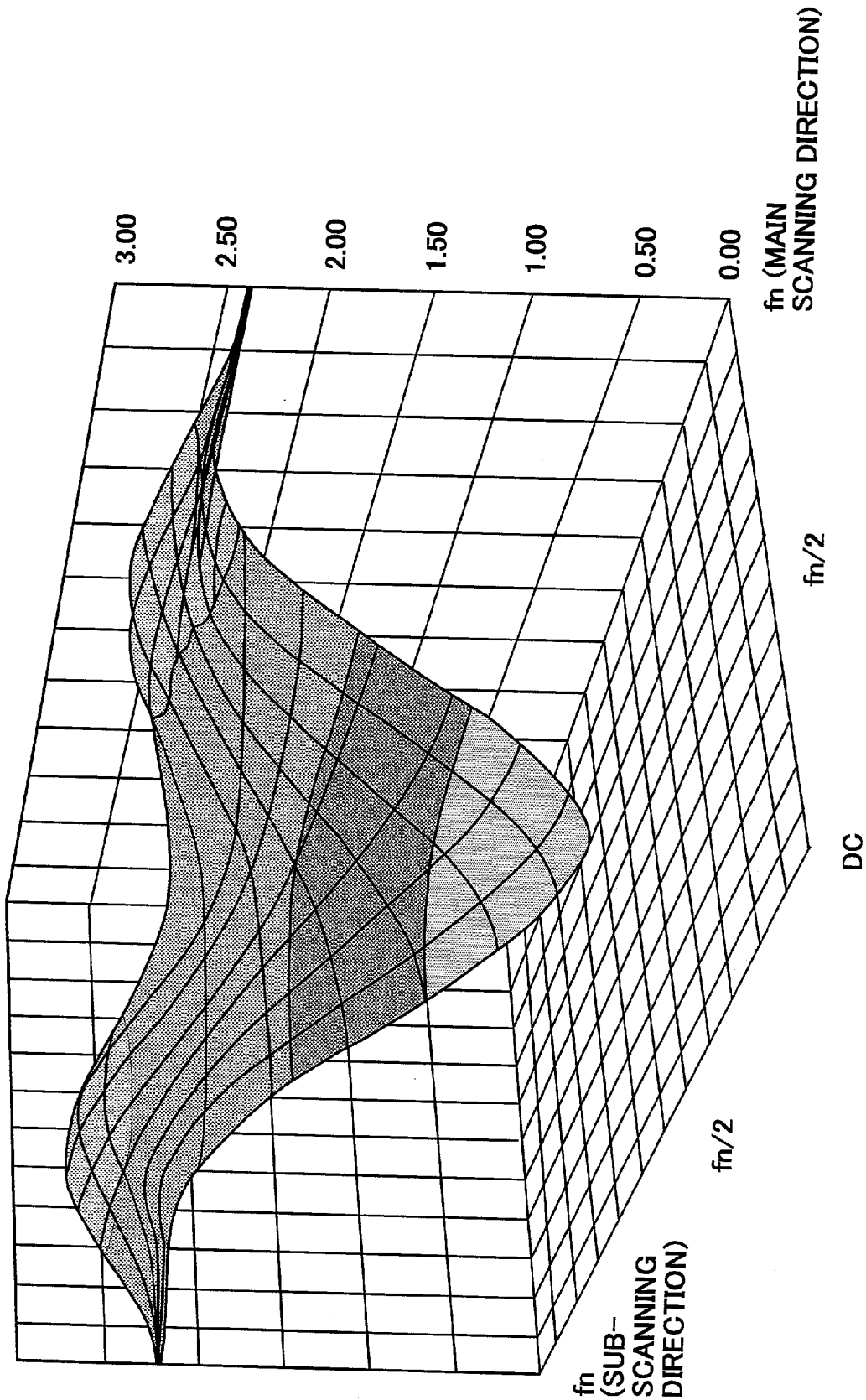
FIG. 5 is a diagram illustrating a frequency characteristic of the filter of FIG. 4.

FIG. 3 illustrates a configuration of the first filtering process part 22. As illustrated in FIG. 3, in this embodiment, the first filtering process part 22 is configured to be an adaptive edge filter with a first filtering process device 31 serving as a base filter. An input signal is inputted into the first filtering process device 31, where a convolution calculation using predetermined filter coefficients is performed, so that a frequency characteristic of the input signal is corrected. A filter adapted here has coefficients for example as indicated in FIG. 4. The filter has a frequency transfer characteristic as illustrated in FIG. 5, that performs an enhancement with respect to a medium-to-high frequency band range and a weaker enhancement with respect to a slanting direction at 45 degrees on a two dimensional space. Thereby, while a moire caused by an excessive enhancement at a halftone dot image having a 45 degrees screen angle characteristic is suppressed, an appropriate edge enhancement is performed with respect to other medium-to-high frequency band ranges.

Figure 6:
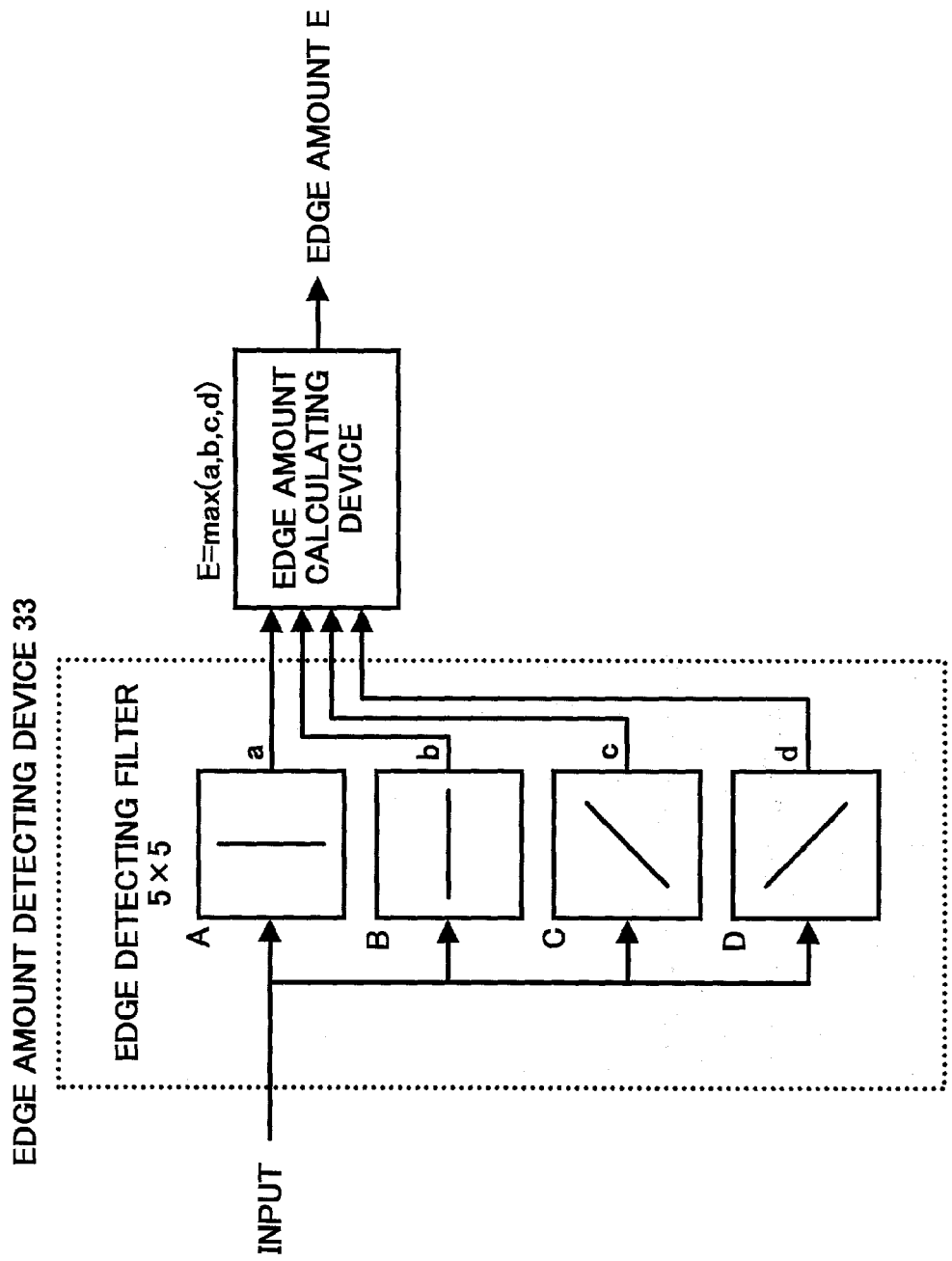
FIG. 6 is a diagram illustrating an exemplary configuration of an edge amount detecting device of the first filtering process part.

The input image signal is also inputted into an edge amount detecting device 33, so that an edge amount included in the image signal is detected. FIG. 6 illustrates an exemplary configuration of the edge amount detecting device 33. Edge detecting filters (A, B, C, D) for four directions in FIG. 6 include 1st derivative filters illustrated in FIGS. 7, 8, 9, 10, respectively. FIG. 7 illustrates coefficients of a filter of an (A) block in FIG. 6, which detects an edge component in a vertical direction in an image and outputs an absolute value (a) of the edge amount. FIG. 8 illustrates coefficients of a filter of a (B) block in FIG. 6, which detects an edge component of the image in a horizontal direction and outputs an absolute value (b) of the edge amount. FIG. 9 and FIG. 10 illustrate filter coefficients of (C) and (D) blocks in FIG. 6, which detect edge components of the image in slanted directions and output absolute values (c) and (d), respectively. These absolute values (a), (b), (c) and (d) of edge detecting results in four directions are compared with each other, so that a maximum value of them is set as an edge amount (E), which is then outputted by the edge amount detecting device 33, The edge amount (E) detected by the edge amount detecting device 33 is converted by an edge amount conversion device 34 to be outputted as an edge amount (C). The edge amount conversion device 34 includes for example a conversion table realizing conversion illustrated in FIG. 11. The conversion table has a non-linear conversion characteristic in which, for the edge amount (E) equal to or exceeding a predetermined value, the edge amount (C) after conversion saturates.

Figures 11, 12:
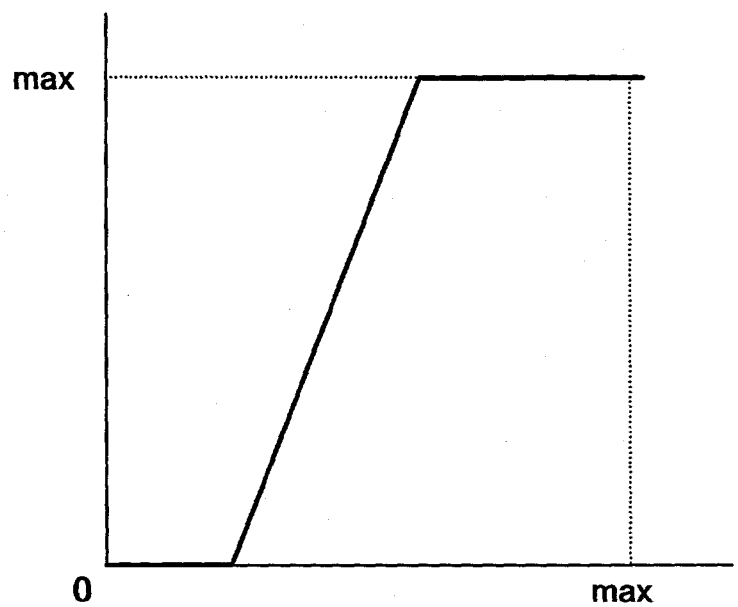
FIG. 11 is a diagram illustrating an exemplary edge amount conversion characteristic of an edge amount conversion device of the first filtering process part.
FIG. 12 is a diagram illustrating exemplary coefficients of a filter of a second filtering process device of the first filtering process part.
Figure 13:
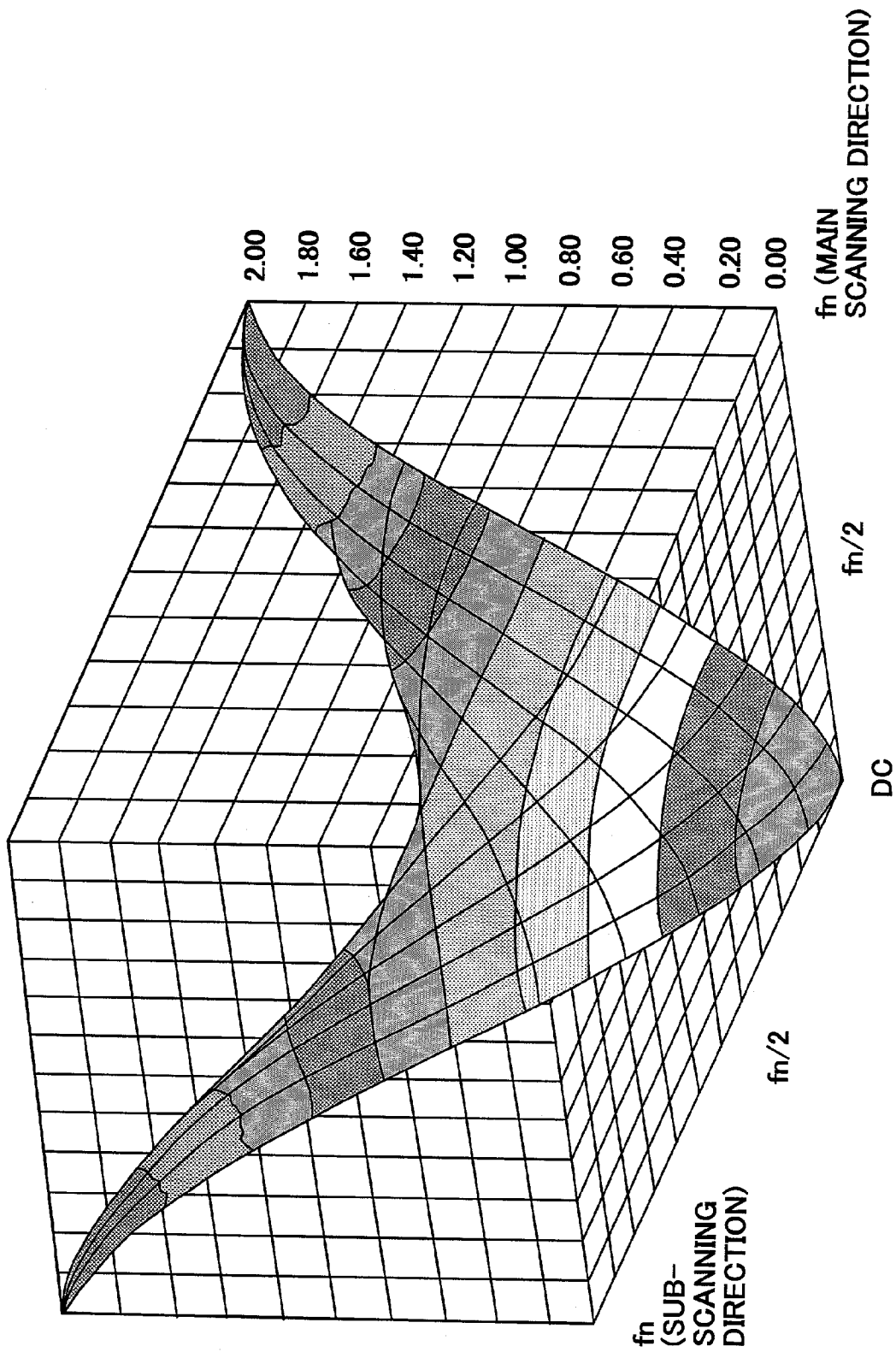
FIG. 13 is a diagram illustrating a frequency characteristic of a filter of the second filtering process device of FIG. 12.

The second filtering process device 32 extracts a predetermined frequency component of an input image signal, for example, by a 2nd derivative filter illustrated in FIG. 12. The 2nd derivative filter illustrated in FIG. 12 has a space frequency transfer characteristic illustrated in FIG. 13 and extracts a high frequency band component. A multiplier 35 multiplies a frequency component extracted by the second filtering process device 32 and the edge amount (C) from the edge amount conversion device 34, and outputs a result to an adder 36. The adder 36 then adds the result of the multiplier 35 and a result of the first filtering process device 31, and outputs a result thereof as an output value of the first filtering process part 22. The above-described processings are performed for each of selected picture elements of an inputted image.

By configuring the first filtering process part 22 as described above, a frequency characteristic of medium-to-high frequency halftone dots can be corrected before a correction and an edge enhancement process based on the edge amount (C) from the edge amount conversion device 34 can be performed with respect to edge portions of characters, etc. Thereby, an image can be reproduced with its sharpness in character portions increased.

In the above-described embodiment, an example has been presented in which the edge amount detecting device 33 includes a 1st derivative filter of a 5×5 matrix size. However, the present invention is not limited to such a matrix size, and can be practiced using a 1st derivative filter of a different matrix size. Further, a 2nd derivative filter can be used in place of the 1st derivative filter. In each case, substantially the same effect as described above can be obtained. Further, in the above-described embodiment, an example has been presented, in which the edge amount conversion device 33 is configured to non-linearly convert the edge amount (E) by a conversion table. However, the edge amount (E) may be converted by a functional formula, etc.

Figure 14:
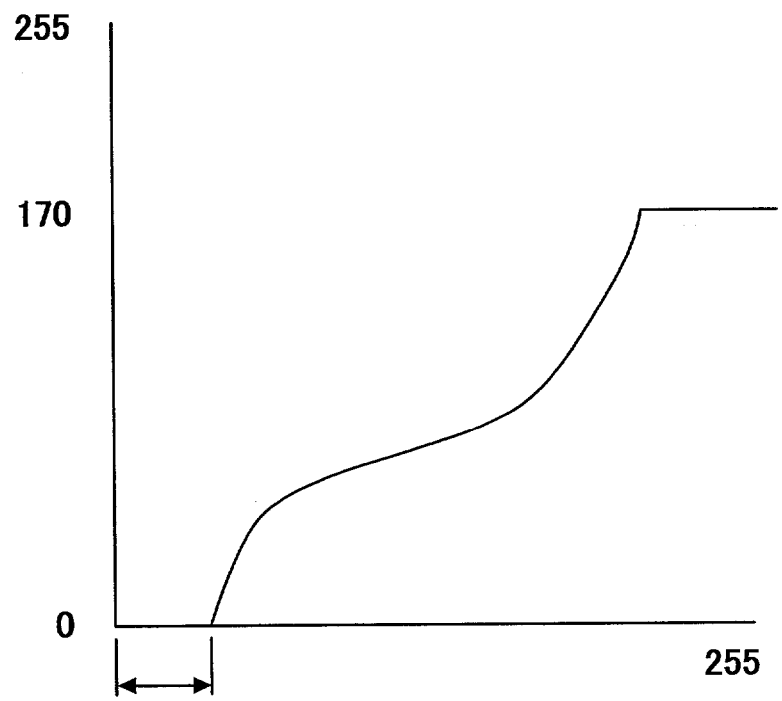
FIG. 14 is a diagram illustrating an exemplary gradation correction characteristic of a density conversion (correction) part of the image processing apparatus preventing a backside information duplicating phenomenon.

FIG. 14 illustrates a gradation correction characteristic of the density conversion (correction) part 23 according to the present invention. In duplicating an original manuscript with a digital copying machine, a phenomenon of duplicating information or an image on a backside of the original manuscript described earlier may occur, as illustrated in FIG. 15.

Accordingly, in the embodiment of the present invention, as illustrated in FIG. 14, at the density conversion (correction) part 23, a gradation correction is performed such that an output value for an input value with respect to a low-contrast portion of an image for duplication, at which input value backside information of an original manuscript may be also duplicated, is converted to zero (representing "white").

Figure 16:
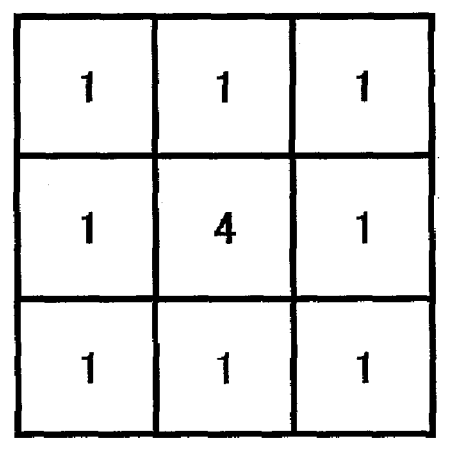
Figure 17:
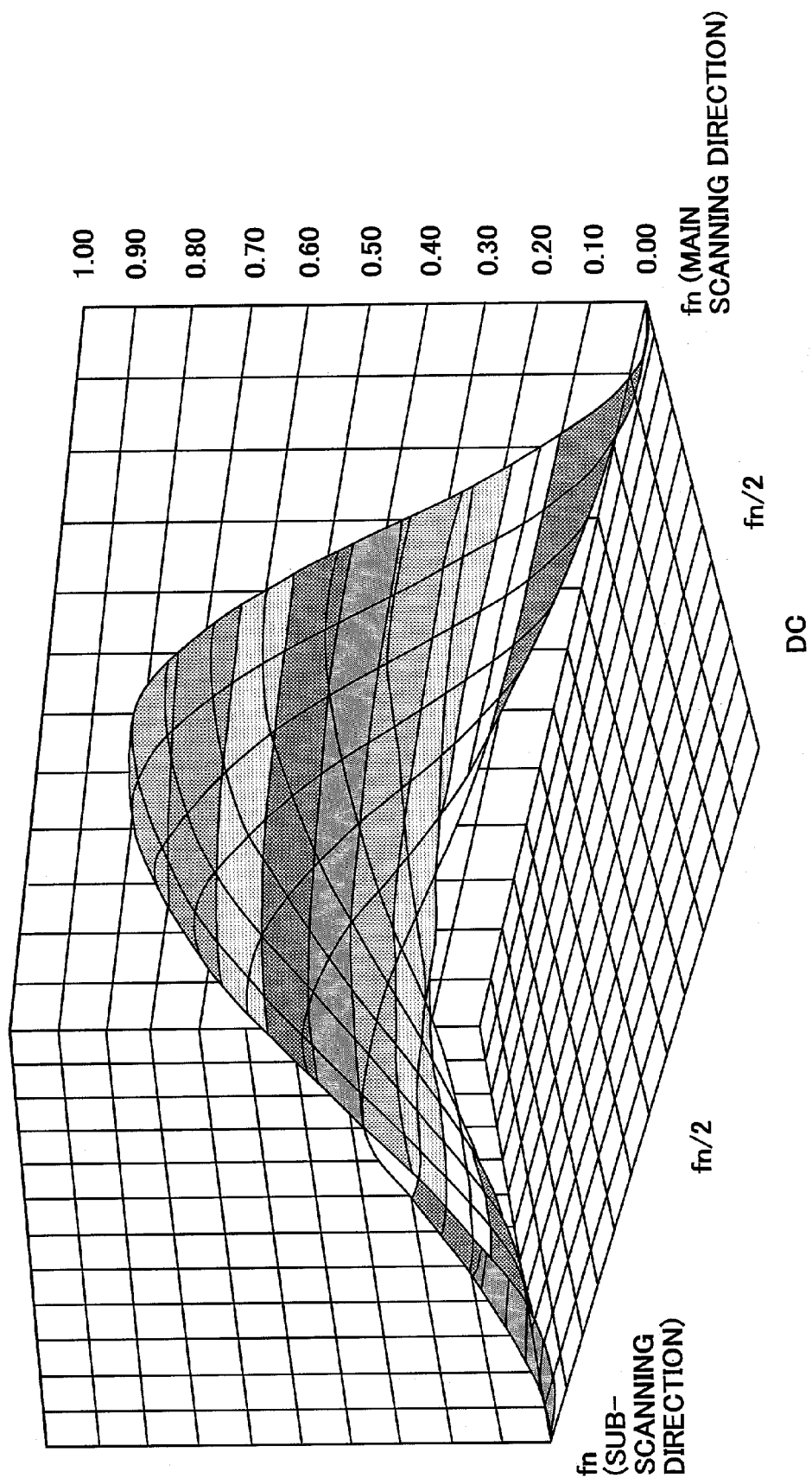
FIG. 17 is a diagram illustrating a frequency characteristic of the filter of FIG. 16.

At the second filtering process part 24, a signal having a frequency at which an interfering moire is caused by a periodicity of a halftone dot portion of an original manuscript and that in a halftone processing (using a dither method for example) at a later stage is attenuated for example by a smoothing filter illustrated in FIG. 16. The smoothing filter illustrated in FIG. 16 has a space frequency transfer characteristic as illustrated in FIG. 17 and performs a smoothing process for a high frequency band area. By thus performing a smoothing process immediately before a halftone processing having a periodicity, direct control of a smoothing filter is enabled, and thereby occurrence of an interfering moire on an output image can be suppressed.

Figure 18:
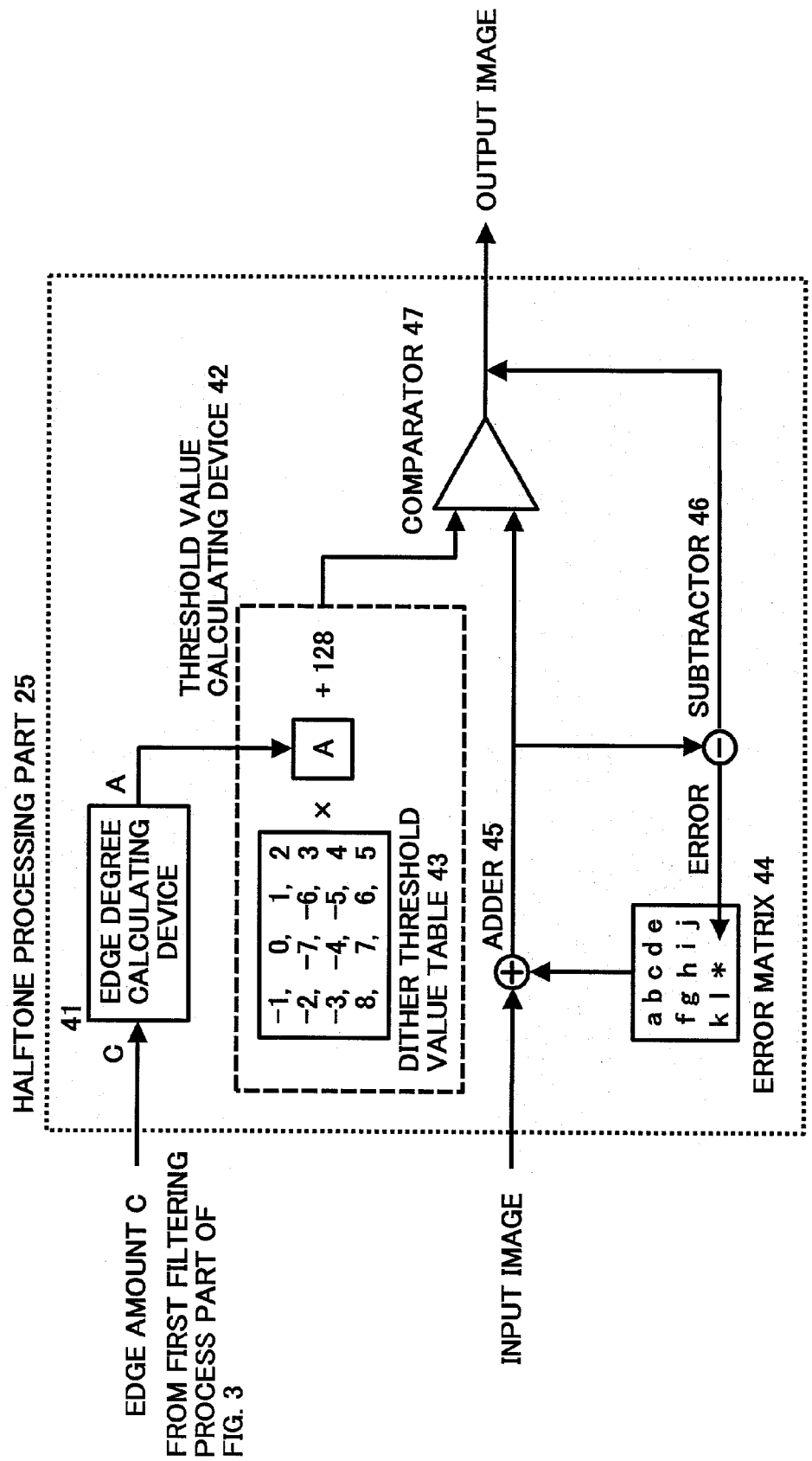
FIG. 18 is diagram illustrating a halftone processing part of the image processing apparatus.

FIG. 18 illustrates an exemplary configuration of the halftone processing part 25, in which a dither threshold value amplitude error diffusion process is employed. An edge degree (A) is calculated from the edge amount (C) calculated by the first filtering process part 22, and according to the edge degree (A) the amplitude of a dither threshold value is adjusted, so that an error diffusion process is performed.

The error diffusion process will be described more in detail referring to FIG. 18 for an example where an output is in one bit for simplicity sake. In FIG. 18, image data is compared with a threshold value calculated by a threshold calculating device 42 at a comparator 47. If the image data is equal to or greater than the threshold value, a corresponding picture element is determined to be ON so that a dot is formed, and if the image data is not greater than the threshold value, the corresponding picture element is determined to be OFF so that a dot is not formed. A difference between a result of the comparison at the comparator 47 and the image data is determined as an error, which is stored as the error for the corresponding picture element in an error matrix 44. The error matrix 44 is configured in a 5×3 matrix size as illustrated in FIG. 18, and coefficients "a" through "l" are stored for each picture element with the coefficients amounted to 32 in total.

In calculating an output value for a next picture element, image data of a selected picture element and $\frac{1}{32}$ of a sum of products of surrounding picture elements and the error matrix coefficients "a" through "l" are added at an adder 45. A result of addition at the adder 45 is compared at the comparator 47 with the threshold value calculated at the threshold value calculating device 42, so that the picture element is determined to be ON or OFF. The above-described process is repeated for each picture element, and thereby an error diffusion process in which image density is stored is performed.

Figure 19:
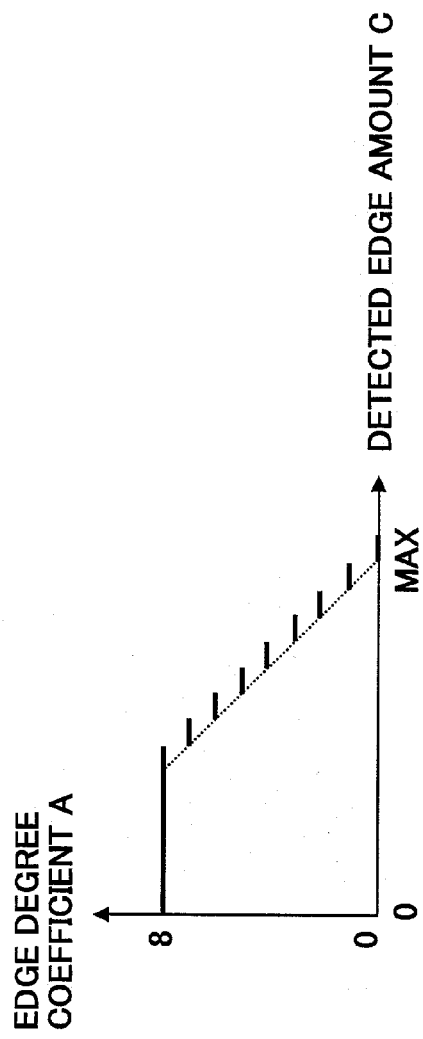
FIG. 19 is a diagram illustrating an exemplary edge degree calculating characteristic of an edge degree calculating device of the halftone processing part.

A dither threshold value table 43 is configured in a 4×4 matrix as illustrated in FIG. 18, in which values from −7 to +8 are arranged in order in a form of convolution. Each threshold value is multiplied with the edge degree (A) calculated by the edge degree calculating device 41. In this case, the edge degree (A) has, as illustrated in FIG. 19, a scale of from a zero level where the edge degree is minimum (no edge portion exists) to an 8 level where the edge degree is maximum. A threshold value for each picture element is calculated by adding a fixed value of 128 to a result of multiplying the edge degree (A) with each value of the table 43. That is, the threshold value is configured to amplify relative to a center level of 128. As a result, at a portion where an image edge is relatively large, the threshold value may be fixed at 128, and at a portion where the image edge is relatively flat, the threshold value may be variable between 72 and 192.

In the embodiment, an output of a dither threshold value amplitude error diffusion process is in one bit, however, the output can be in a plurality of bits.

As described above, because the halftone processing part 25 is configured as illustrated in FIG. 18, continuous tone portions and halftone dot portions having a high number of lines in an image are processed by a process of a dither system having a periodicity, which is superior in stability and graininess in electrophotographic printing engines. Further, edge portions in the image are processed by a process of an error diffusion system, so that sharpness of the image is kept.

Thus, because an image processing apparatus according to an embodiment of the present invention is configured as described above, even when a conversion process part is configured to have a gradation characteristic preventing a background information duplicating phenomenon, in a reproduced image of an input image having halftone dot portions, density decrease and omission of information at a low-density halftone dot portion are avoided. Further, even when a quasi-gradation processing having a periodicity is performed at a halftone processing part at a later stage, occurrence of an interfering moire can be suppressed, and thereby high quality reproduction of an original manuscript including halftone dot portions can be realized.

Figure 20:
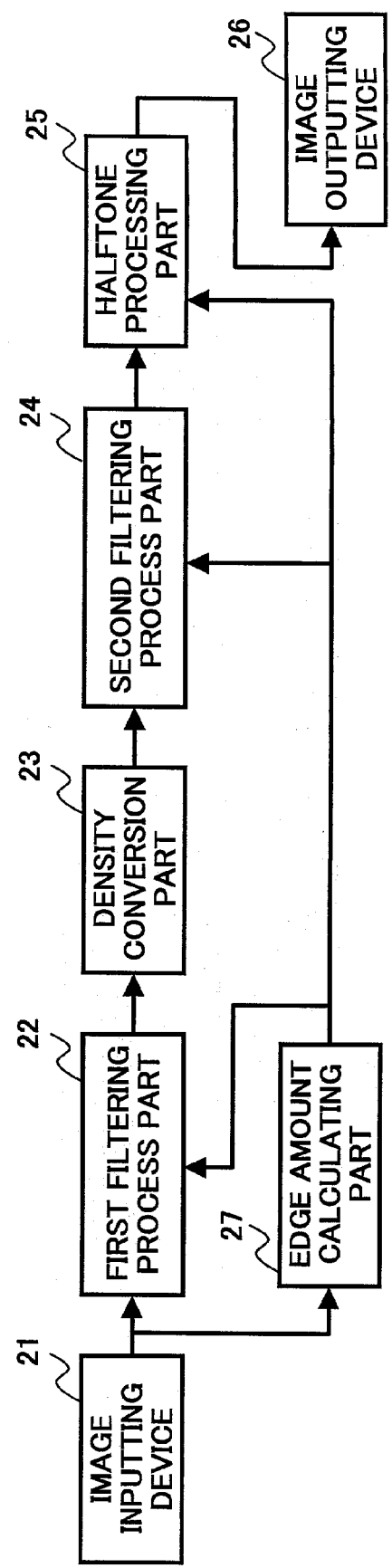
FIG. 20 is a diagram illustrating a configuration of an image processing apparatus according to another preferred embodiment of the present invention.

FIG. 20 illustrates a construction of an image processing apparatus according to another embodiment of the present invention. An image signal inputted by the image inputting device 21 is processed by the first filtering process part 22 so that a space frequency characteristic is corrected. The inputted image signal is inputted to an edge amount calculating part 27 also, and edge amounts at a selected picture element and at surrounding picture elements as well are calculated. A control signal from the edge amount calculating part 27 is inputted into the first filtering process part 22, the second processing part 24 and the halftone processing part 25, so that appropriate processings according to the calculated edge amounts are performed respectively.

The image signal after its space frequency characteristic having been corrected at the first filtering process part 22 is inputted into the density conversion (conversion process) part 23. At the density conversion part 23, a gradation characteristic of an original manuscript is converted to a desired gradation characteristic for an output image of the image outputting device 26. Thereafter, the image signal is processed by the second filtering process part 24 which uses an edge amount for a control signal, so that the space frequency characteristic is corrected. The image signal is further processed with a quasi-halftone processing at the halftone processing part 25, which also uses an edge amount for a control signal. The image outputting device 26 performs an outputting of an image, for example, onto a sheet.

Figure 21:
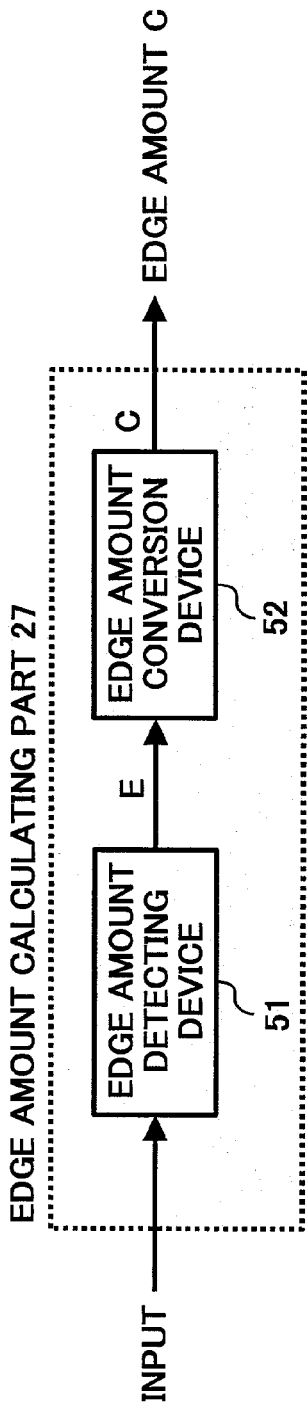
FIG. 21 is a diagram illustrating a configuration of an edge amount calculating part of the image processing apparatus of FIG. 20.

FIG. 21 illustrates an exemplary configuration of the edge amount calculating part 27 of this embodiment. As illustrated in FIG. 21, an input image signal is inputted into an edge amount detecting device 51 so that an edge amount in the image signal is detected. The edge amount detecting device 33 described with reference to FIG. 6 for the previous embodiment is used for the edge amount detecting device 51. The edge amount (E) is obtained substantially in the same manner as in the previous embodiment.

The edge amount (E) is converted by an edge amount conversion device 52 to an edge amount (C) to be outputted. The edge amount conversion device 52 uses the conversion table described above with reference to FIG. 11 for the previous embodiment. The edge amount calculating part 27 outputs the edge amount (C), which is then used for control signals in respective processings at the first filtering process part 22, the second filtering process part 24, and the halftone processing part 25.

Figure 22:
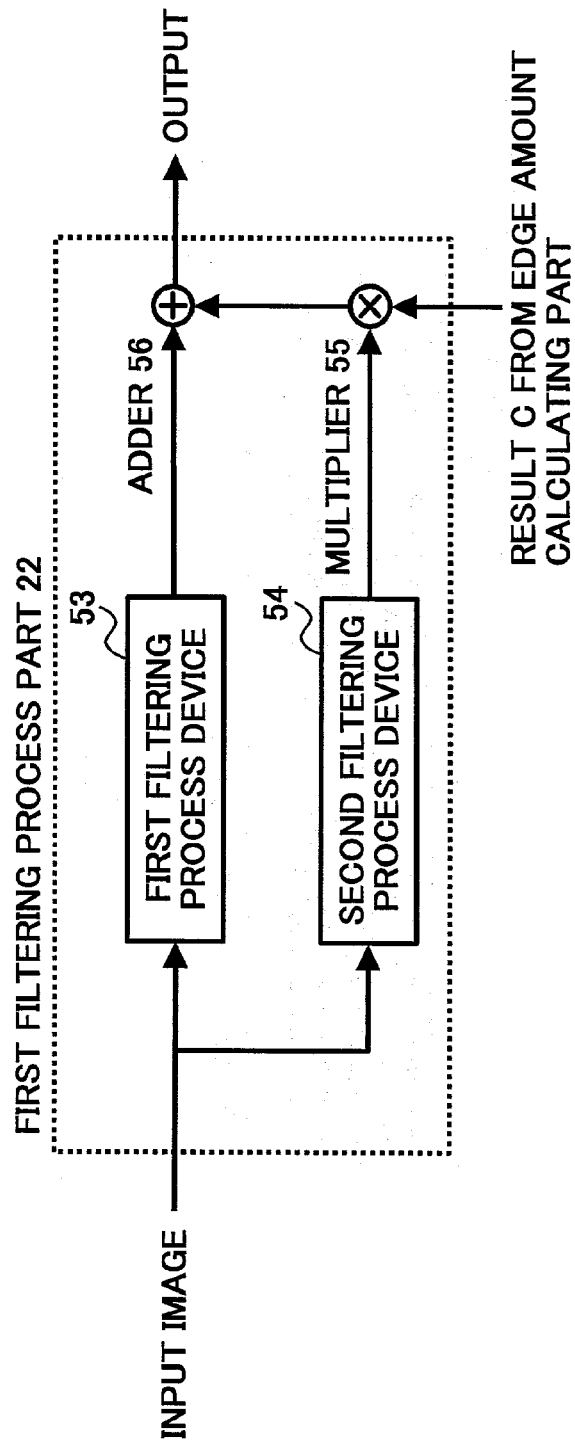
FIG. 22 is a diagram illustrating a configuration of a first filtering process part of the image processing apparatus of FIG. 20.

FIG. 22 illustrates an exemplary construction of the first filtering process part 22 of this embodiment. As illustrated in FIG. 22, in this embodiment, the first filtering process part 22 is configured to be an adaptive edge filtering device with a first filtering process device 53 serving for a base filter. An input signal is inputted into the first filtering process device 53, where a convolution calculation using predetermined filter coefficients is performed, so that a frequency characteristic of the input signal is corrected. A filter adapted here may have the coefficients indicated in FIG. 4 as in the previous embodiment. The filter has a frequency transfer characteristic illustrated in FIG. 5, that performs an enhancement with respect to medium-to-high frequency band ranges and a weaker enhancement with respect to a slanting direction at a 45 degrees on a two-dimensional space. With this configuration, while a moire caused by an excessive enhancement at a halftone dot image having a 45 degrees screen angle characteristic is suppressed, an appropriate edge enhancement is performed with respect to other medium-to-high frequency band ranges.

The second filtering processing device 54 extracts a predetermined frequency component of an input image signal, for example, by a 2nd derivative filter illustrated in FIG. 12, as in the previous embodiment. The 2nd derivative filter illustrated in FIG. 12 has a space frequency transfer characteristic illustrated in FIG. 13, and extracts a high frequency band component. A multiplier 55 multiplies a frequency component extracted by the second filtering process device 54 and the edge amount (C) from the edge amount conversion device 27, and outputs a result of the calculation to an adder 56. The adder 56 then adds the result of the multiplier 55 and a result of the first filtering process device 53, and outputs a result thereof as an output value of the first filtering process part 22.

By configuring the first filtering process part 22 as described above, the frequency characteristic of medium-to-high frequency halftone dots can be corrected before a correction and an adaptive edge enhancement process based on the edge amount (C) from the edge amount conversion part 27 can be performed with respect to edge portions of characters, etc. Thereby, an image can be reproduced with its sharpness in character portions increased.

Figure 15:
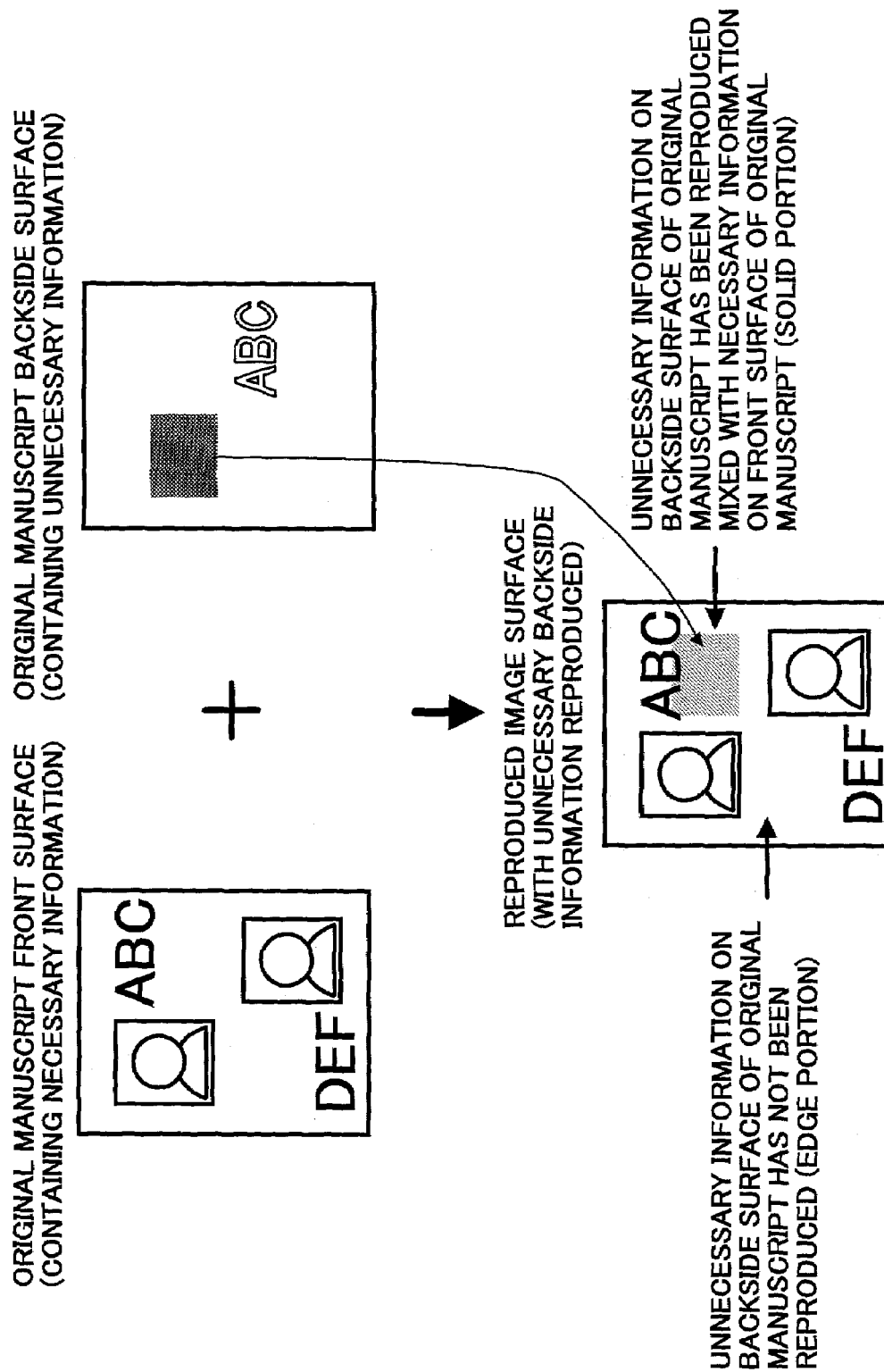
FIG. 15 is diagram illustrating a background information duplicating phenomenon.

The process at the density conversion (correction) part 23 is substantially the same as in the previous embodiment described with reference to FIG. 14 and FIG. 15. Specifically, at the density conversion (correction) part 23, a gradation correction is performed such that an output value for an input value with respect to a low-contrast portion at which backside information of an original manuscript may be also duplicated is converted to zero (representing "white") or to a value close to zero.

Figure 23:
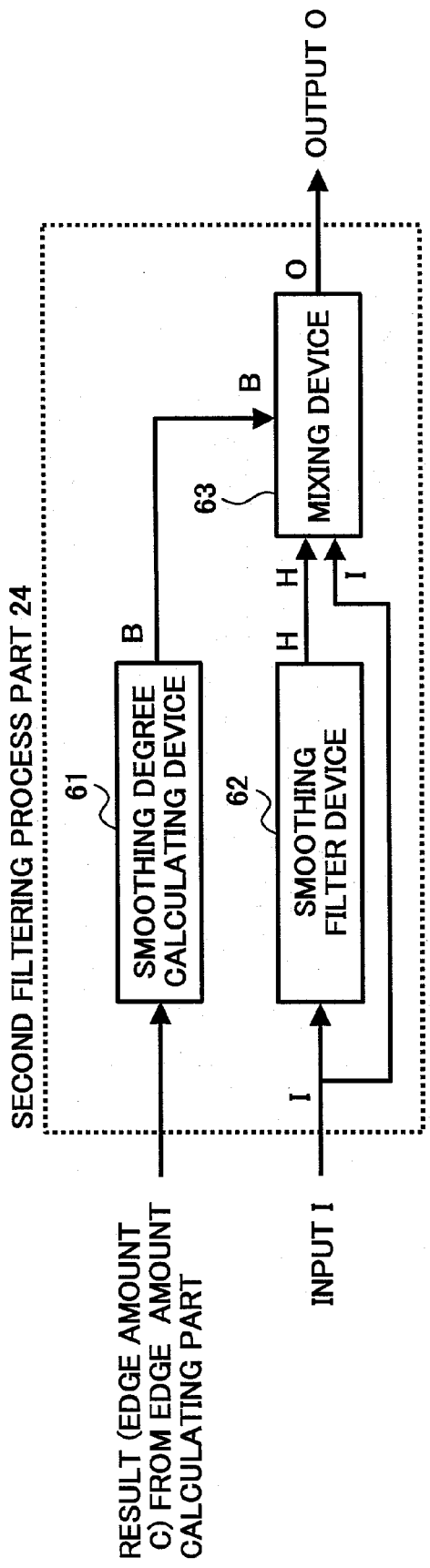
FIG. 23 is a diagram illustrating a configuration of a second filtering process part of the image processing apparatus of FIG. 20.
Figure 24:
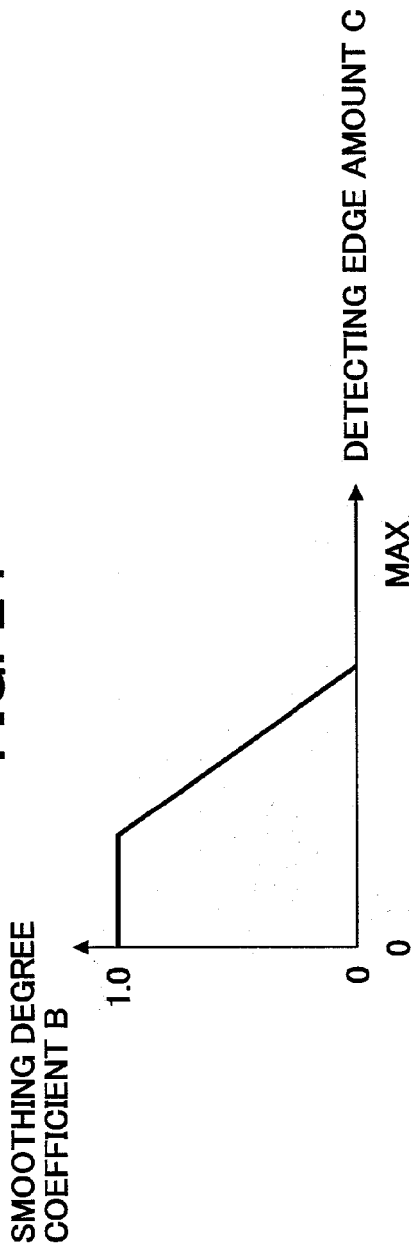
FIG. 24 is a diagram illustrating a smoothing degree calculating characteristic of a smoothing degree calculating device of the second filtering process part of FIG. 23.

FIG. 23 illustrates an exemplary configuration of the second filtering process part 24 in this embodiment. The second filtering process part 24 includes a filter to perform an adaptive smoothing process. The edge amount (C) inputted as a control signal is inputted into a smoothing degree calculating device 61 so that a smoothing degree (B) is calculated. Here, the smoothing degree calculating device 61 is configured so as to increase the smoothing degree (B) as the edge amount (C) is smaller as indicated in FIG. 24.

An input signal (I) which has been processed at the density conversion part 23 so that its density is converted (i.e., an output signal of the density conversion part 23) is inputted into a smoothing filter device 62. The smoothing filter device 62 includes a smoothing filter such as the one illustrated in FIG. 16, and has a characteristic to attenuate a signal having a frequency at which an interfering moire is caused by a periodicity in a halftone dot portion of an original manuscript and that in a halftone processing at a subsequent stage. The smoothing filter of FIG. 16 has a space frequency transfer characteristic illustrated in FIG. 17, and performs a smoothing process to a high frequency band range.

An output value (H) of the smoothing filter device 62 is inputted into a mixing device 63. The output value (H) of the smoothing filter device 62 and an inputthrough value of the input signal (I) (the output of the density conversion part 23) are inputted into the mixing device 63, where both signal values are added to be mixed together at a ratio based on the smoothing degree (B). This addition and mixture is expressed by the following formula;

$$O = B \times H + (1-B) \times I$$

Herein, "O" represents an output value, "B" represents a smoothing degree (0.0–1.0), "H" represents an output of a smoothing filter, and "I" represents an input-through value.

Figure 25:
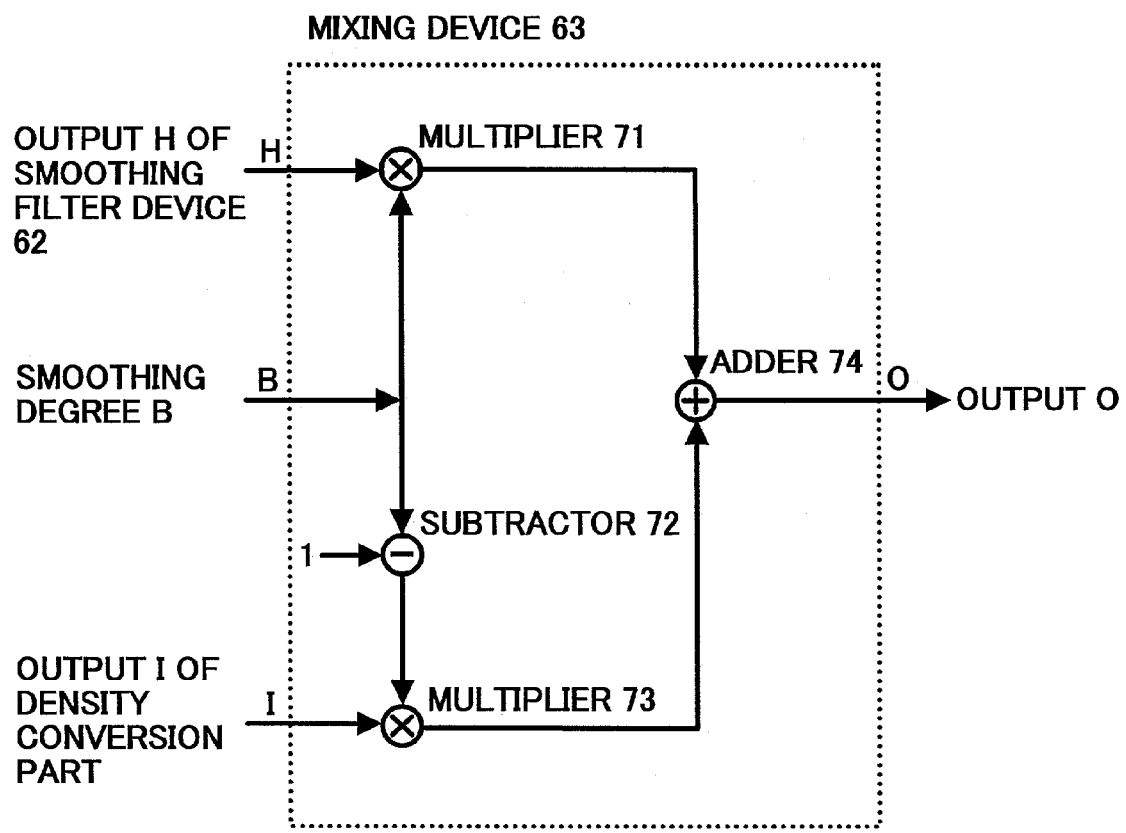
FIG. 25 is a diagram illustrating a configuration of a mixing device of the second filtering process part of FIG. 23.

FIG. 25 illustrates an exemplary configuration of the mixing device 63. An output value (O) of the mixing device 63 is an output value of the second filtering process part 24.

With the above-described configuration, in a continuous tone area or a halftone dot area with a large number of lines of an image of an original manuscript, where an edge amount is relatively small, the edge amount (C) is relatively small and thereby the smoothing degree is relatively large. Accordingly, by performing a smoothing process immediately before a halftone processing having a periodicity, occurrence of an interfering moire in an output image can be suppressed. On the other hand, in a character and line image area where an edge amount is relatively large, the edge amount (C) is relatively large and therefore the smoothing degree is relatively small. Accordingly, decrease in the sharpness in the character and line image area due to an excessive smoothing can be prevented.

In the above-described embodiment, an example has been presented, in which the smoothing degree calculating device 61 of FIG. 24 is configured to convert the edge amount (C) non-linearly using a conversion table. However, the edge amount (C) may be converted by a functional formula, etc.

The halftone processing part 25 of this embodiment is substantially the same as that in the previous embodiment described referring to FIG. 18 and FIG. 19. Therefore, description thereof is omitted. However, for this embodiment, in FIG. 18, "edge amount C from first filtering process part of FIG. 3" is replaced by "edge amount C from edge amount calculating part of FIG. 21".

Thus, in an image processing apparatus according to the immediately-above-described embodiment of the present invention, even when a conversion process part is configured to have a gradation characteristic preventing a background information duplicating phenomenon, in a reproduced image of an input image having halftone dot portions, density decrease and omission of information in low-density areas of the halftone dot portions are avoided. Further, even when a quasi-halftone processing having a periodicity is performed in a halftone processing at a later stage, sharpness of edge portions of character and line images can be kept, while suppressing occurrence of an interfering moire. Thereby, an image of an original manuscript having halftone dot portions can be reproduced in high quality.

As described above, according to the present invention, the advantages described below can be obtained.

(1) Because a smoothing process is performed before a halftone processing having a periodicity, occurrence of an interfering moire at a halftone dot image portion of an image is suppressed. Further, because a conversion process is performed between a first filtering process and a second filtering process, excessive density decrease or omission of information does not occur, and an output image superior in stability and graininess can be obtained by a copying machine, etc.

(2) By performing a smoothing process only to a frequency band area where an interfering moire may be caused by a periodicity in a halftone dot area and that in a halftone processing, an image can be reproduced with sharpness being kept in frequency band areas where such an interfering moire will not occur.

(3) By correcting beforehand the frequency characteristic in a halftone dot area of a relatively low density with a medium-to-large number of lines such that undulation of density in the halftone dot area is increased in a first filtering process before a conversion process, occurrence of density difference between a halftone dot portion having a large number of lines and a halftone dot portion having a small number of lines in a reproduced image can be suppressed.

(4) A smoothing process is not performed at a first filtering process part before a correction process to a halftone dot area, such as a particularly low density halftone dot portion having a large number of lines, where undulation of its density is desired to be kept until immediately before the correction process and to be eliminated immediately before a halftone processing. Therefore, even if the correction process is performed such that an output value for a low-contrast portion tends to be converted to "white" for avoiding a background information duplicating phenomenon, excessive image density decrease or omission of information does not occur, so that an output image, superior in stability and graininess, can be obtained.

(5) A smoothing process is performed based on a characteristic of an image and control of the amplitude in a halftone processing is appropriately performed, so that smoothing is performed only to a necessary area in the image based on the characteristic of the image and a quasi-halftone processing of a large amplitude is performed. Therefore, an output image in which sharpness is kept in edge portions of character and line images and in which stability and graininess are superior in graphic portions can be obtained by a copying machine, etc.

(6) By detecting an edge amount of input image data, increasing the smoothing degree in a corresponding area as the edge amount is smaller, and controlling a dither amplitude in a halftone processing to be larger, while in a flat area where an edge amount of an image is relatively small and a graphic area such as a halftone dot area with a large number of lines, a halftone processing with a relatively large amplitude is performed after performing a relatively large smoothing, thereby enabling reproduction of an output image having no interfering moire and superior in stability and graininess with a copying machine, etc., in an area of character and line images where the edge amount is relatively large, a relatively small smoothing is performed and the dither amplitude in the halftone processing is controlled to be smaller, thereby enabling reproduction of an image with sharpness in edge portions of the image being kept with a copying machine, etc.

Numerous additional modifications and variations of the present invention are possible in light of the above teachings. It is therefore to be understood that within the scope of the appended claims, the present invention may be practiced otherwise than as specifically described herein.

What is claimed as new and is desired to be secured by Letter Patent of the United States is:

1. An image processing apparatus, comprising:
   a first filtering process device configured to perform a first predetermined space frequency characteristic conversion process to input image data having multiple-level gradation;
   a conversion process device configured to perform a gradation characteristic conversion process to an output result of the first filtering process device and to convert an output value with respect to a low-contrast portion of the input image to zero or to a value close to zero;
   a second filtering process device configured to perform a second predetermined space frequency characteristic conversion process to an output result of the conversion process device and to smooth a frequency component of the input image data causing an interfering moire; and
   a halftone processing device configured to perform a quasi-gradation processing to an output result of the second filtering process device.

2. The image processing apparatus according to claim 1, wherein the first filtering process device is configured to enhance a medium-to-high frequency component of the input image data.

3. An image processing apparatus, comprising:
   a first filtering process device configured to perform a first predetermined space frequency characteristic conversion process to input image data having multiple-level gradation;
   a conversion process device configured to perform a gradation characteristic conversion process to an output result of the first filtering process device and to convert an output value with respect to a low-contrast portion of the input image data to zero or to a value close to zero;
   a second filtering process device configured to perform a smoothing process to an output result of the conversion process device according to a characteristic of an image of a selected picture element or picture elements in the vicinity of the selected picture element; and
   a halftone processing device configured to perform a quasi-gradation processing to an output result of the second filtering process device, wherein the second filtering process device is configured to increase a smoothing degree as the edge amount is smaller, and the halftone processing device is configured to increase a dither amplitude as the edge amount is smaller.

4. The image processing apparatus according to claim 3, wherein the first filtering process device is configured to enhance a medium-to-high frequency component of the input image data.

5. An image processing apparatus, comprising:
   first space frequency converting means for performing a first predetermined space frequency characteristic conversion process to input image data having multiple-level gradation;
   gradation characteristic converting means for performing a gradation characteristic conversion process to an output result of the first space frequency characteristic converting means and for converting an output value with respect to a low-contrast portion of the input image data to zero or to a value close to zero;
   second space frequency converting means for performing a second predetermined space frequency characteristic conversion process to an output result of the gradation characteristic converting means and for smoothing a frequency component of the input image data causing an interfering moire; and
   halftone processing means for performing a quasi-gradation processing to an output result of the second space frequency converting means.

6. An image processing apparatus, comprising:
   first space frequency converting means for performing a predetermined space frequency characteristic conversion process to input image data having multiple-level gradation;
   gradation characteristic converting means for performing a gradation characteristic conversion process to an output result of the first space frequency converting means and for converting an output value with respect to a low-contrast portion of the input image data to zero or to a value close to zero;
   smoothing means for performing a smoothing process to an output result of the gradation characteristic converting means according to a characteristic of an image of a selected picture element or picture elements in the vicinity of the selected picture element; and
   halftone processing means for performing a quasi-gradation processing to an output result of the smoothing means,
   wherein the smoothing means is configured to increase a smoothing degree as the edge amount is smaller, and the halftone processing means is configured to increase a dither amplitude as the edge amount is smaller.

7. An image processing method, comprising:
   a first step of performing a predetermined space frequency characteristic conversion process to input image data having multiple-level gradation;
   a second step of performing a gradation characteristic conversion process to an output result of the first step and converting an output value with respect to the input image data to zero or to a value close to zero;
   a third step of performing a smoothing process to an output result of the second step according to a characteristic of an image of a selected picture element or picture elements in the vicinity of the selected picture element; and a fourth step of performing a quasi-gradation processing to an output result of the third step.

8. The image processing method according to claim 7, wherein in the first step a medium-to-high frequency component of the input image data is enhanced.

9. The image forming method according to claim 7, wherein in the third step the image characteristic includes an edge amount and a smoothing degree is increased as the edge amount is smaller, and wherein in the fourth step a dither amplitude is increased as the edge amount is smaller.

* * * * *